Figure 1:
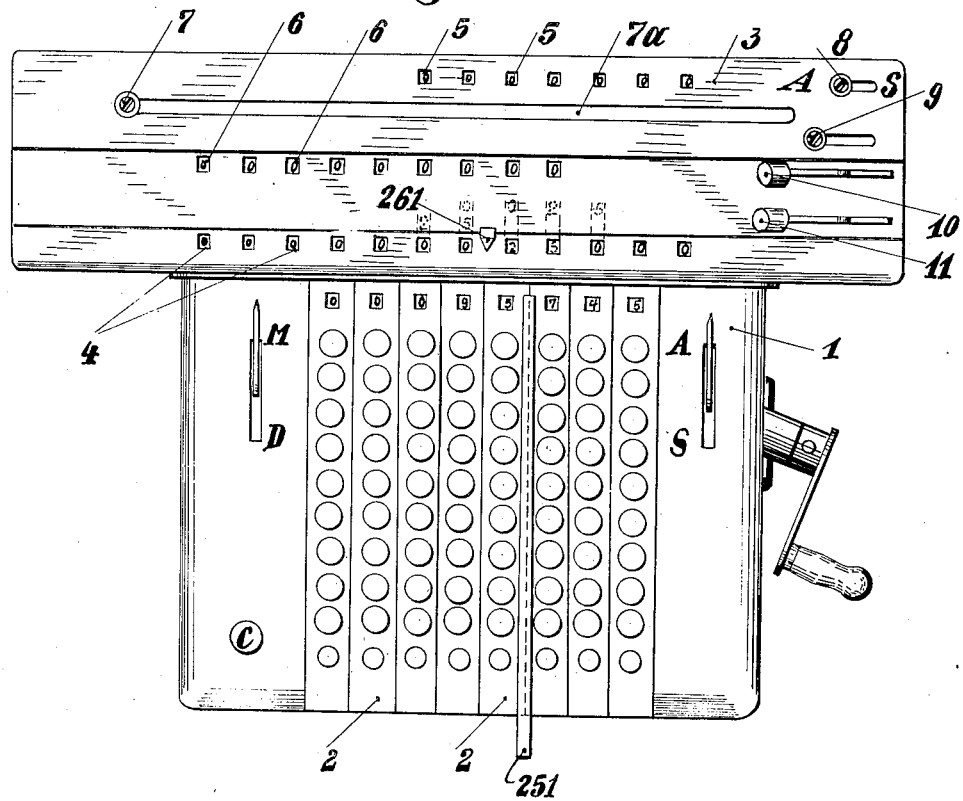

March 6, 1934.  A. KOTTMANN  1,950,183

AUTOMATIC ROUNDING OFF MECHANISM FOR CALCULATING MACHINES

Filed Feb. 11, 1932  4 Sheets-Sheet 1

INVENTOR
AUGUST KOTTMANN
ATTORNEYS

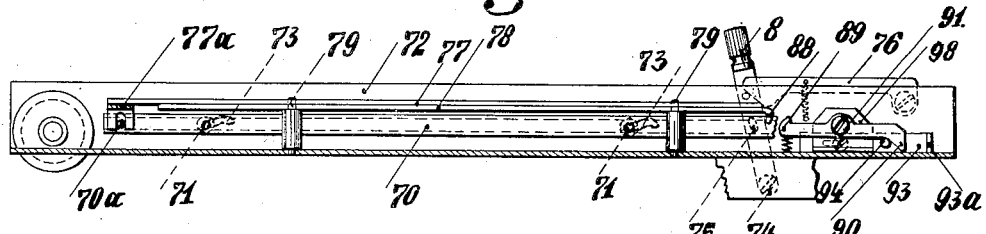
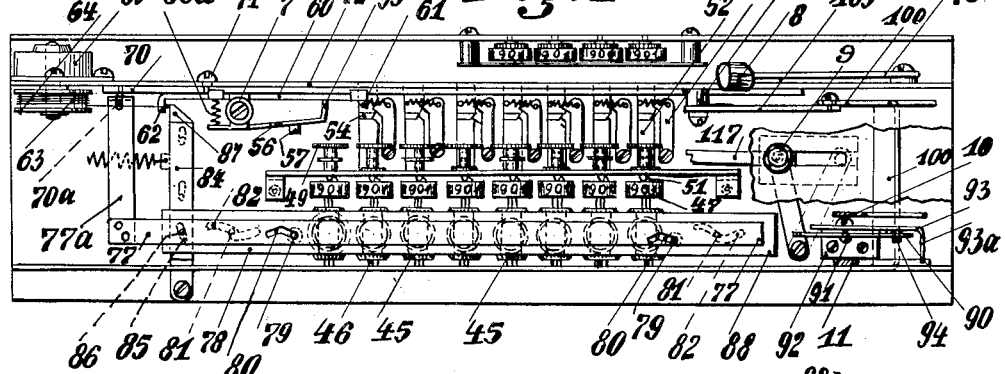
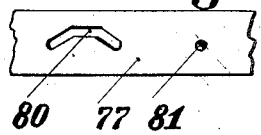
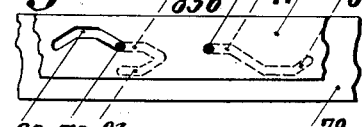
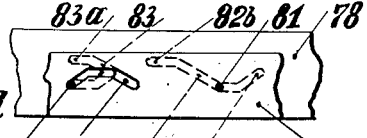
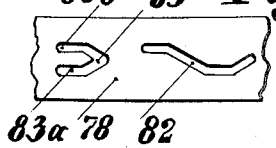

March 6, 1934.  A. KOTTMANN  1,950,183
AUTOMATIC ROUNDING OFF MECHANISM FOR CALCULATING MACHINES
Filed Feb. 11, 1932  4 Sheets-Sheet 3
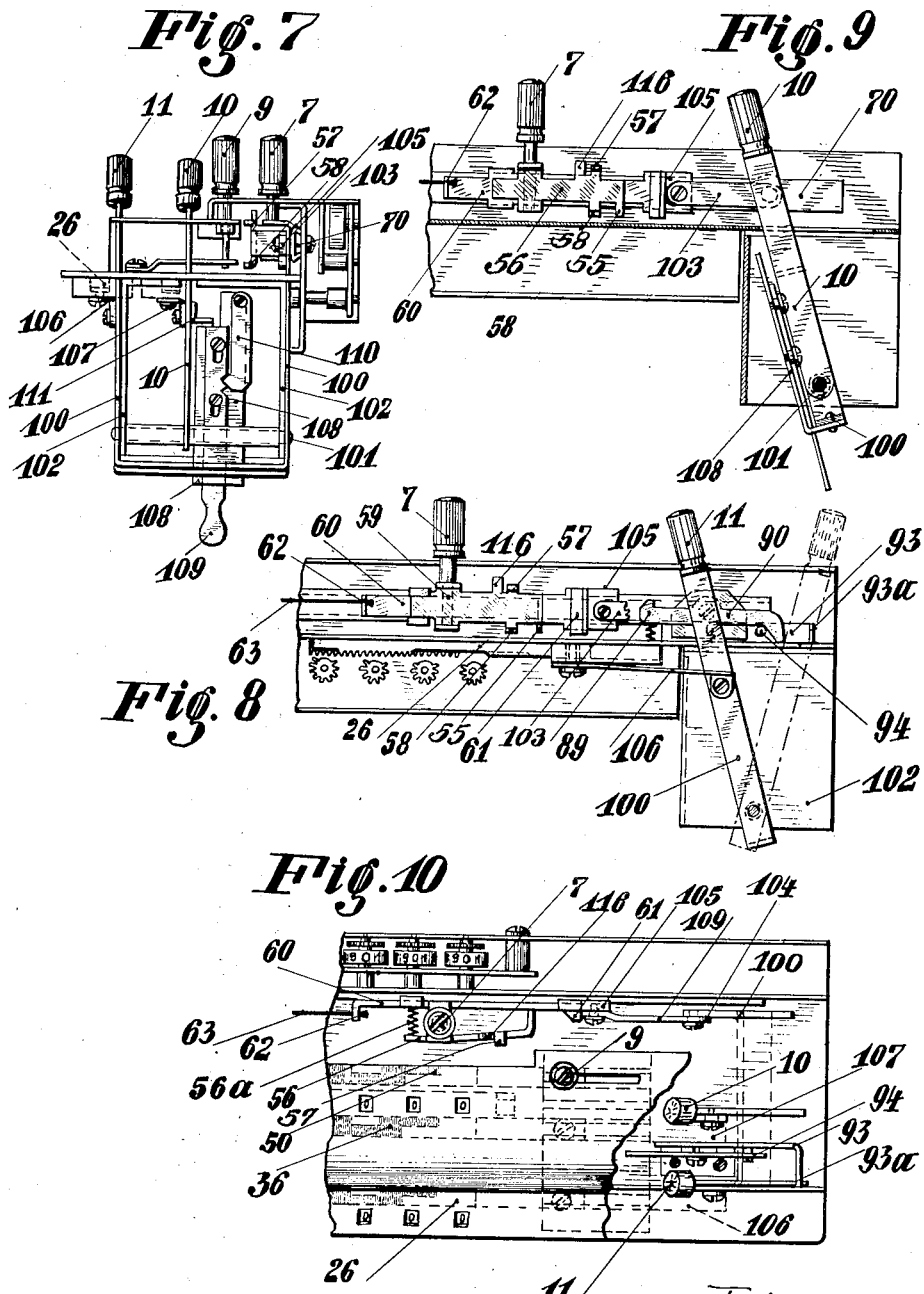
INVENTOR
AUGUST KOTTMANN
BY
ATTORNEYS.

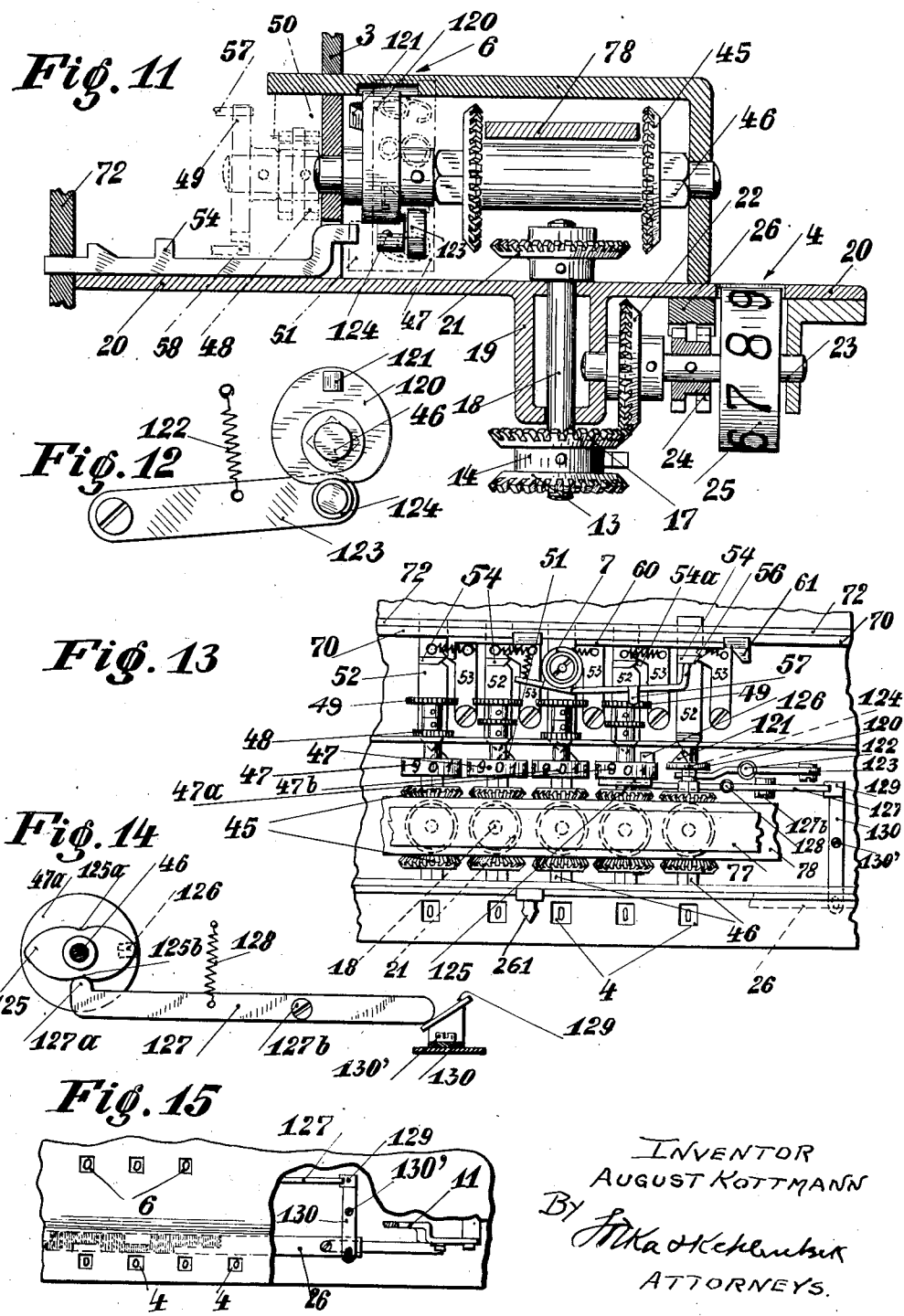

Patented Mar. 6, 1934

1,950,183

UNITED STATES PATENT OFFICE 1,950,183

AUTOMATIC ROUNDING OFF MECHANISM FOR CALCULATING MACHINES

August Kottmann, Sommerda, Germany, assignor to Rheinische Metallwaaren- und Maschinenfabrik Sommerda Aktiengesellschaft, Sommerda, Germany, a corporation of Germany Application February 11, 1932, Serial No. 592,284
In Germany February 14, 1931

10 Claims. (Cl. 235—75)

My present invention relates to rounding off mechanisms for calculating machines, and has for its purpose to provide a mechanism of this character which will round off results of a calculation, not simply to the nearest unit of the lowest denomination (for instance, hundredths) which is to appear in the result, but to some particular units of such denomination. For instance, if the result is expressed in dollars and cents, it may not be sufficient in all cases to obtain a result rounded off to the nearest amount of cents, because in the practice of some dealers or manufacturers, the price of goods is always given or rounded off to the nearest nickel, or in other words, all items appearing in the bills of such merchants or manufacturers will have either a zero or a 5 in the cents column. In this particular instance, the improved mechanism forming the subject-matter of my present application would be so constructed that all cents indications will be rounded off either to zero or to 5. Of course, the invention is not limited to this particular case, or even to cases in which only two different units will appear in the lowest denomination.

The accompanying drawings illustrate my improvements applied, as an additional feature, to a rounding off mechanism of the type disclosed in my pending application Serial No. 487,463 filed in the United States Patent Office on October 9, 1930, and issued as Patent No. 1,908,986 on May 16, 1933. According to said earlier application the result is to be expressed in a limited number of figures to the right of the decimal point, for instance two figures when the result represents a price in dollars and cents. If during the calculation the final result yields more than two figures to the right of the decimal point, the result is rounded off to two figures, the last figure to the right being increased by 1 if the succeeding figure amounts to 5 or more; if, however, the succeeding figure is less than 5, the last figure (second to the right of the decimal point, in the case assumed) is left unchanged. If for instance the result of a multiplication is 25.97617 and it is intended to round off the result to two figures to the right of the decimal point, this result will be rounded off to 25.98 and will so appear in the accumulator mechanism of the device of my patent above mentioned. On the other hand, assuming that the result of a multiplication is 25.97241 and that it is again desired to round off the result to two figures to the right of the decimal point, the rounded off result would be 25.97. The rounding off obtained in the manner described in my earlier application and also explained below, is carried further by a second rounding off operation so that according to my present invention the last figure appearing in the result will not be any one of the units from 0 to 9, but only some particular unit, for instance either 0 or 5. Thus the results rounded off according to my previous application would be again rounded off to the value zero, five, or ten. The mean between 0 and 5 is 2.5 and the mean between 5 and 10 is 7.5. The values 2.5 and 7.5 therefore constitute the limits for the second rounding off operation. If the result in the last figure which it is desired to use (for instance, in the case assumed, the second figure to the right of the decimal point) shows one or two units after the first rounding off operation, the figure indicating one or two units is changed or reduced to zero; if however said last figure, after the first rounding off, indicates three, four, six or seven units, it is rounded off to five, and finally if such last figure after the first rounding off indicates eight or nine units, it is rounded off to ten units, that is to say, the last figure is changed to zero and the preceding figure is raised by one unit.

Figure 2:
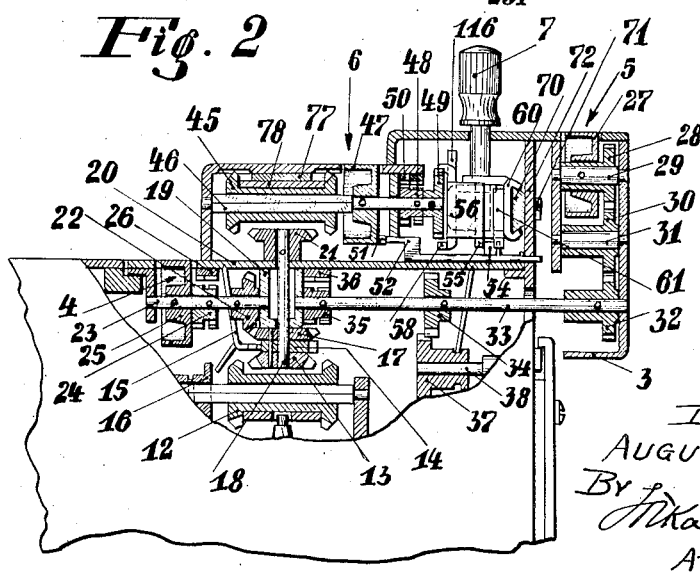

In the accompanying drawings Fig. 1 is a diagrammatic plan view showing a portion of a calculating machine embodying my invention, said machine being of the same general character as disclosed in my above mentioned earlier application; Fig. 2 shows a side view of the machine partly in section; Fig. 3 is a vertical section illustrating the carriage of the computing mechanism; Fig. 4 is a plan view of the carriage shown in Fig. 3, the cover plate being almost entirely cut away to show the interior structure; Figs. 5a, 5b, 5c, 6a, 6b, 6c and 6d are views showing certain details of the machine as will be explained hereinbelow; Fig. 7 shows a side view in section of the clearing mechanism with its coupling devices; Fig. 8 is a front view of the mechanism shown in Fig. 7; Fig. 9 is a view similar to Fig. 8 but with parts omitted to expose to view other parts not visible in Fig. 8; Fig. 10 illustrates a plan view of the mechanism shown in Figs. 7 to 9; Fig. 11 shows part of the rounding off mechanism in vertical section; Fig. 12 illustrates a detail of Fig. 11; Fig. 13 is a plan view, upon an enlarged scale, showing a portion of the rounding off device; Fig. 14 is a detail elevation with parts in section, showing a detail of the novel rounding off device, upon a still larger scale, and Fig. 15 is a partial plan view showing a detail of the control device for the rounding off mechanism.

The calculating machine as shown in Fig. 1 includes a frame 1, a keyboard 2 and a carriage 3.

The latter carries the product computing mechanism 4, the rotary computing mechanism 5 and the accumulator or sum-computing mechanism 6.

A slide 60 (Figs. 2, 4, 7, 8, 9, 10) operated by a knob 7 and movable back and forth across the whole width of the computing mechanisms 4 and 6 corresponding to the length of the slot 7a, (Fig. 1), serves to transfer the individual products from the product computing mechanism 4 into the accumulator 6. By operating the lever 8 the transfer of the product into the accumulator is preparatively set for addition or subtraction, that is, the transfer is made additive or subtractive. A clearing key 9 is associated with the accumulator, a clearing key 10 with the rotary counter mechanism, and a clearing key 11 with the product computing mechanism.

The product computing mechanism 4 is operated in the usual manner by means of stepped drums which are not shown on the drawings as they form no part of the present invention, the drive being communicated to such mechanism by means of a double bevelled gear 12 (Fig. 2). When the main driving crank is in its initial or zero position, the double bevel gear 12 is out of engagement with a bevel gear 13; it engages the gear 13, however, as soon as the driving crank leaves its initial position. The transfer of the products from the product computing mechanism 4 to the accumulator 6 always occurs when the drive is at rest, that is, when the bevel gears 12 and 13 are out of engagement. The adjustment of the number wheels 25 of the product mechanism 4 to zero position is accomplished by means of the zero positioning wheels 24 which are engaged by a zero positioning rack 26 operated by the clearing key 11 by means of the guide-bar 106 (Figs. 7, 8, 10 and 11).

The tens transfer in the product computing mechanism takes place in the usual manner. Upon the shafts 18 of the bevel gears 13, which drive the number wheels 25 through the bevel gears 17, 22 and the shafts 23, are located the setting lugs 14 (Figs. 2 and 11), which actuate the levers 15 and thereby shift the tens transfer wheels 16. The latter come into engagement in their shifted position with the tens transfer cams of the stepped drum shafts.

The shafts 18 of the bevel gears 13 are journalled in the plate 20 forming part of the casing of the machine and in a U-shaped bracket or channel member 19, and carry, in addition to the bevel gears 13, 17 and the tens setting lugs 14, also the bevel wheels 21 which lie above the plate 20.

The accumulator 6 is composed of the number wheels 47. To transfer number values from the product mechanism into the accumulator the double bevel gears 45 are brought into mesh with the bevel gears 21. The double bevel gears 45 are mounted slidably upon square portions of parallel equidistant shafts 46 which, at the same time, serve as the shafts for the number wheels 47 fast thereon and carry the zero-positioning pinions 48 and likewise the tens transfer wheels 49. A clearing rack 50 operated from the clearing key 9 is arranged to engage the pinions 48.

The number wheels 47 of the accumulator 6 are located side by side and carry tens transfer preparing or setting lugs 51. Upon rotation of the number wheels from 0 back to 9, or from 9 to 0, the lugs 51 move the tens setting slides 52 (Fig. 2) toward the right. The tens setting slides 52 carry upwardly extending projections 54, provided with inclined surfaces 54a (Fig. 13) and are held in their right and left-hand end positions by means of holding spring-pressed pawls 53 (Fig. 4.)

The slide 60, which effects the transfer of the products and is shifted by means of the manually operated knob 7 (Figs. 1, 2 and 3), slides upon a track 70 along the wall 72. A spring located within a housing 65 pulls the slide 60 toward the left (Figs. 3 and 4) by means of a cord or cable which is wound upon the drum 64 and is attached to the bent end 62 of such slide. The bent end 62, when the slide 60 is moved toward the right, engages the shifter 87 of a lever 84 shortly after the slide 60 leaves its initial position, and swings such lever toward the right, whereupon the drive 21, 45 is brought into operation as described hereinbelow. The slide 60 further on moves past the number wheels of the accumulator 6 during its idle movement and shortly before the end of its travel strikes against a shifter 105 (Figs. 7, 8, 9, 10), which is likewise guided upon the track 70 and is connected through a member 103 to a bail 100 (Figs. 4, 7, 8, 9, 10) fixed to the clearing key 11. As the slide 60 moves the shifter 105 it oscillates thereby the clearing member 11 and in this way adjusts the product computing mechanism to its zero position and effects the transfer of the product into the accumulator 6 through the thrown-in drive 21, 45. After the zero position is reached, the slide 60 and shifter 105 are moved somewhat further to the right, whereupon the clearing key 11 is given an additional stroke and throws the bevel gears 21, 45 out of engagement in a manner to be more fully described hereinbelow.

The slide 60 carries an oscillating lever 56 (Figs. 2, 4, 7, 8, 9, 10) upon a pin 59. The lever 56 carries laterally projecting tens transfer cams 57, 58 and likewise the upwardly directed abutment 116 and the downwardly directed abutment 55. The lever 56 is normally held in position with its bent end, which carries the abutment 55, against the slide 60. The latter carries at its right end a projection 61 whose function will be explained below.

After the transfer of the product and after the disengagement of the drive 21, 45 upon the movement of the slide 60 to the right, the latter returns to its initial position due to the pull of the spring in the housing 65. During this movement the slide 60 slides along all the number wheels 47 of the accumulator. If, now, any tens transfer mechanisms have been preparatively set in any of the denominations of the accumulator upon the transfer thereinto of a product, that is, if any of the tens setting slides 52 have been shifted to the right in Fig. 2 (which is the same thing as upwardly in Figs. 4 and 13), then the upwardly directed projections 54 of such slides provided with the inclined surfaces 54a lie in the path of the downwardly directed projection 55 of the lever 56, whereupon as the slide 60 moves toward the left (Fig. 4), the lever 56 is pressed toward the tens transfer wheels 49. By such swinging of the lever 56, the tens transfer cam 57 engages in the tens transfer wheel 49 (Figs. 2, 4, 11 and 13), of the next higher denomination and rotates the latter additionally for one division upon continued movement of the slide 60. If other tens transfer devices have been set in any of the other denominations of the accumulator, the lever 56 completes the tens transfer at these places also as it sweeps past them. The same tens transfer cam thus accomplishes in succession the tens transfer in all of the prepared denominations of the computing mechanism. The projection 61 upon the slide 60 moves the previously set tens setting slides 52 back into their inoperative position.

During the movement of the slide 60 toward the right, no number value is transferred into the number wheels of the accumulator, and no tens transfer has been prepared. Therefore no projection 54 will be in the path of the projection 55 of the lever 56, and thus the projection 55 will be able to travel freely in the rear of all the projections 54 during such movement of the slide 60 to the right.

The rail 70 upon which the slide 60 glides is guided in curved slots 73 (Fig. 3) in the wall 72. Upon swinging the lever 8 to the position for subtraction (that is, for subtractive transference of the product into the accumulator) the rail 70 is shifted somewhat towards the right by means of a pin 75 on the lever 8, and is raised a short distance due to the outline of the curved slots 73. The transfer slide 60 and the lever 56 are at the same time also raised, whereupon instead of the tens transfer cam 57 the tens transfer cam 58 engages in the tens transfer wheels 49 of the number wheels 47 of the accumulator computing mechanism. The number wheels are now rotated in the opposite direction by cam 58 during the tens transfer.

A pin 70a upon the rail 70 engages in the forked end of an arm 77a (Figs. 3 and 4) attached to the bar 77 and shifts the latter to the right when the lever 8 is swung to the position for subtraction.

A rail 78 lies under the bar 77 and is operative to shift the double bevel gears 45 and in this manner throws the bevel gears 21, 45 into or out of engagement. The bar 77 and rail 78 are carried and guided by the supporting pins 79.

The bar 77 is movable upon the pins 79 which pass through two curved slots 80 (Figs. 5a) in such bar; the rail 78 is likewise movable upon the supporting pins, the latter engaging in curved slots 83 having the two branches 83a and 83b (Fig. 5c). A pin 81 on the bar 77 engages in a curved slot 82 (Figs. 4 and 5c) of the rail 78, which slot as can be seen from Fig. 5b is composed of three parts 82a, 82b and 82c. The part 82a is similar to the curved slot 83a, and the part 82b to the slot 83b. The part 82c functions merely as a connection between the two slot portions 82a and 82b. The curved slot 80 of the bar 77 is a mirrored image of, i. e., is symmetrical with, the joined slot portions 82a and 82c of the slot 82. When the lever 8 is adjusted to the position for addition, the position of the bar 77 and rail 78 is that shown in Fig. 6a. Shifting of the rail 78 toward the right then causes it to be shifted downwardly for a short distance at the pin 81 by the curved slot 82 (that is, the part 82b), as shown in Fig. 6b. The pin 79 in such case slides in the curved slot portion 83b. The double bevelled gears 45 are then brought into engagement with the gear 21 (Fig. 2) by the shifting of the rail 78 in the manner necessary for the additive transfer of products from the product computing mechanism into the accumulator.

Upon swinging the lever 8 to the position for subtraction, the bar 77 is shifted toward the right upon the supporting pin 79 in the curved slot 80. The pin 81 in such event slides along the curved slot 82 (in consequence of the symmetrical form of the curved slots 80 and 82a and 82c) to the right end of such slot (Fig. 6c). If the rail 78 is now shifted to the right (Fig. 6c), the pin 81 and slot 82 (that is, the portion 82a) force it downwardly (instead of upwardly as in the preceding case). The pin 79 in such event slides in the slot branch 83a. The double bevel gears 45 then come into engagement with the bevel gears 21 through such shifting in the manner necessary for subtractive product transference.

The rail 78 (Fig. 4) is connected with the lever 84 through the slot 85 and pin 86. The lever 84, as stated above, is oscillated by the bent end 62 of the slide 60 upon actuation of the latter and moves the rail 78 in such manner that the gears 21, 45 are brought into engagement. The slide 87 at the end of the lever 84 is shiftable longitudinally of such lever to permit the bent end 62 to position itself behind the same upon return of the slide 60.

The rail 78, which has been shifted toward the right, passes with its downwardly bent end 88 behind the nose 89 of a spring pressed pawl 90 (Figs. 3 and 4) which is pivotally mounted upon a stud 91 fixed to a support 98. A slide 93 provided with an end portion 93a bent at right angles to the body thereof is guided upon the support 98. Upon the transference of a product and upon the accompanying adjustment to zero position of the product computing mechanism, the clearing key 11, which, after the zero positioning is complete, is additionally oscillated, as above described, strikes against the bent end of the slide 93 and moves it toward the right. The pawl 90 is simultaneously swung by the pin 94 and the rail 78 released. As a result, the drive 21, 45 is again thrown out after the zero positioning and transference of the product is complete.

A further blind computing denomination is arranged near the lowest column or denomination of the accumulator (Figs. 11, 12, 13); in such additional denomination the numeral wheel 47 is replaced by a heart-shaped cam 120 while the zero positioning pinion 48, the tens transfer wheel 49 and likewise the end of the square shaft 46 otherwise necessary to carry these wheels are omitted. The cam 120 is connected with the square shaft 46 and carries a tens transfer setting cam 121 which is so arranged that it comes into action when the cam 120 is rotated from the value 4 position to the angular position corresponding to the value 5.

If now during the transference of a product the heart-shaped cam is rotated from 4 to 5 or reversely from 5 to 4, the transfer setting cam 121 comes into action. A tens transfer is thus prepared so that upon return of the transfer slide, the numeral value in the lowest denomination of the accumulator computing mechanism is in the case of addition increased by 1, and in the case of subtraction decreased by 1, as is required for rounding off the number.

When after the transference has been completed the double bevelled gear 45 becomes disengaged from the bevelled gear 21, a spring 122 which presses a roller 124 against the periphery of the heart-shaped cam by means of the lever 123, returns the shaft 46 into the zero position.

In the operation of the machine, for example, to carry out the multiplication 95.745×0.25= 23.94, the product to be rounded off at the second decimal place, the following steps are performed:

The multiplicand 95.745 is set up on the key board as far to the right as possible (Fig. 1) the decimal point being indicated by suitably adjusting a decimal bar 251. A decimal slide or pointer 261 which serves simultaneously for the product and for the accumulator computing mechanism is so adjusted that two denominations in the accumulator lie to the right thereof. The mulplier 0.25 is then imagined to be so set up in the product mechanism that the decimal pointer 261 lies between the same numerals between which the decimal is located in the written multiplier. The carriage 3 is then so shifted that the denomination of the product mechanism in which the first numeral other than zero, in the present case the 2, would be located, stands over the denomination of the key board in which the units of the multiplicand are inserted, that is, over the denomination lying immediately to the left of the decimal bar 251. The multiplication is now performed in the usual manner and the complete product appearing in the result mechanism is transferred into the accumulator whereupon the rounding off takes place in an accurate manner.

In general it may be stated that if the result in the accumulator is to be rounded off at "n" denominations after the decimal point, then the decimal pointer 261 is so positioned that "n" denominations in the accumulator lie to the right thereof, and the calculation is in other respects performed exactly as above described.

In Fig. 1 there is shown the multiplier in the sight openings of the product mechanism 4 in the manner in which the multiplier 0.25 of the above given example must be imagined as set up. The numerals are shown in dotted lines to indicate that the multiplier is not actually set up in the machine but exists only in the mind of the operator. Above the sight openings of the result mechanism 4 there is indicated how the setting-up of the multiplier 25 or 0.025 would appear in the imagination. Whether the multiplier is 25.00, 0.25 or 0.025, in all three cases, the carriage must be so shifted before the multiplication is commenced that the numeral 2 of the multiplier lies over the units place of the multiplicand, in other words, over the denomination immediately to the left of the adjusted decimal bar 251.

The position of the shaft 46 carrying cam 120 is not visible from the outside of the machine and immediately to the left of this shaft is arranged that number wheel 47a of the accumulator mechanism which in the formation of the result produces the last figure thereof. According to the embodiment of my present invention illustrated, this number wheel 47a of the lowest denomination is connected with a double heart cam 125 (see Figs. 13 and 14) and a tens preparing lug 126 which will prepare a tens transfer to the next higher denomination of said mechanism whenever the said last number wheel 47a passes from the value 7 to the value 8 during addition, or from the value 8 to the value 7 during subtraction.

The double heart cam 125 has two reentering portions 125a and 125b into which is adapted to drop the end 127a of a lever 127 fulcrumed at 127b, a spring 128 tending to pull the lever 127 toward the center of the cam, that is, toward the shaft 46. The double heart cam 125 is secured to the last number wheel 47a in such a way that when the lever end 127a engages one of the reentering portions or recesses 125a and 125b, such number wheel will indicate either the value zero or the value 5. During the transfer of any value from the number wheel mechanism of the result mechanism into the accumulator, the lever 127 is brought out of engagement with the double heart cam 125 and even out of the path of movement of said cam; for this purpose there is provided a double armed lever 130 fulcrumed at 130' and operatively connected with the clearing rack 26 so as to be actuated thereby when the clearing key 11 is moved. The lever 130 is provided with an oblique face 129 adapted to engage the free (right hand) end of the lever 127. The lever 127 is released from the action of the oblique face 129 only after the tens carrying operation has been completed in the lowermost denominations of the counting mechanism of the accumulator. Therefore, the turning of the lowermost denomination number wheel either forward or backward to the value zero or 5 will take place only after the tens carrying operation has been completed in the lowermost denomination of the counting mechanism.

The transfer of a value is carried out as follows: The knob 7 is moved toward the right, and this movement will first couple in pairs the number wheels of the accumulator mechanism and of the result mechanism and thereupon these wheels will be rotated in unison, by pairs, by setting the counting device of the result mechanism to the zero position. This effects the setting up of the value in the counting device of the accumulator mechanism, excepting for any tens carrying operations that may be required; simultaneously with the number wheels of the counting device of the accumulator mechanism, the heart cam 120 is rotated, and if during such rotation the heart cam passes from 4 to 5, or from 6 to 5, such cam will prepare a tens carrying operation in the lowermost denomination of the accumulator counting device. The last number wheel 47a of the accumulator counting device is also rotated during this operation and if during such rotation it passes from 7 to 8 or from 8 to 7, it prepares a tens carrying operation to the next higher denomination. Shortly before the result counting device reaches the zero position, the movement of the clearing rack 26 swings the lever 130 so as to bring its oblique face 129 below the free end of the lever 127 and to move such lever out of the path of the double heart cam 125. Toward the end of the movement of the knob 7 to the right, the number wheels of both counting devices are again uncoupled from each other. Since the spring 122 presses the roller 124 carried by the lever 123, against the edge of the heart cam 120, the latter is automatically swung back to its original or zero position. During the return movement of the knob 7, from right to left, the previously prepared tens carrying operations, including those prepared by the heart cam 120 and the number wheel 47a of the lowest denomination, are carried out. After the transfer has been effected and the coupling or operative connection of the two counting devices (of the accumulator and the result mechanism) has been discontinued, there will come a moment during the return movement of the knob 7, when the tens carrying operation will have been performed in the lowermost two denominations of the counting device of the accumulator; at this time the clearing rack 26 and the double armed lever 130 will have been moved to such a position that the oblique face 129 of said lever releases the lever 127. The spring 128 will then press the rounded end 127a of said lever against the periphery of the double heart cam 125 and will cause the number wheel 47a rigidly connected with said cam to be brought either to the position corresponding to the value 0 or to the value 5.

From this explanation it will be obvious that, during the transfer of the product 25.97617 mentioned above as an example, into the counting device of the accumulator, the last two figures, 1 and 7, will be omitted, and the figure 6 will become effective for determining the action of the heart cam 120 and of the tens preparing lug 121, since the heart cam 120 has been turned beyond the value 5 and has thus prepared a tens transfer. The lowermost visible number wheel 47a of the accumulator counting device is first turned to the figure 7 and then by one additional unit during the subsequent tens carrying operation, so that the number 8 will then appear in the sight opening. While passing from 7 to 8 this number wheel, by means of its tens carrying lug 126, prepares a tens carrying operation in the next higher denomination which at first shows the number 9 in the sight opening but is turned to 0 after such tens carrying operation has been completed. Thus a tens carrying operation is also prepared by the second lowest number wheel of the accumulator counting device and such tens transfer is immediately thereafter carried out by the slide 60 and lever 56, so that the number wheel indicating units (immediately to the left of the decimal point) will be turned from 5 to 6. Finally, the spring 128 by its action on the lever 127 and the double heart cam 125 will cause the lowest number wheel of the accumulator counting device to be turned to 0. Thus the figure showing in the accumulator counting device will be 26.00, the decimal pointer being indicated at 261 and corresponding to the arrangement shown in my earlier application.

If a device constructed according to my present invention is employed to transfer successively two or more amounts from the product mechanism 4 to the accumulator mechanism 6 and added in the counting device of the accumulator, the rounding off to 0 or to 5 will take place only after the addition has been effected in the accumulator counting device. In commercial calculations effected by hand, it is customary in such cases to round off each amount or item separately to 0 or 5 and then to add such items. The result obtained by my present improvement however is exactly the same as will be now explained in detail.

An amount transferred to the accumulator counting device will always have either a 0 or a 5 in its lowest denomination, since after adding each item the last place or lowest denomination of the sum or total is always rounded off to 0 or 5.

If the sum already entered in the accumulator counting device ends in 0, the rounding off at the lowest denomination will take place exactly as if the accumulator counting device did not contain any amount as yet. But even if the lowest denomination of the amount previously entered in the accumulator counting device should be a 5, the final result will be the same upon adding one of the numbers from 0 to 9, whether according to the usual practice the items are first rounded off and then added or whether according to the method of the present machine the items are first added and the rounding off performed subsequently.

The example of my invention described above will indicate the last number of the result either as a 0 or as a 5, that is to say, one or the other of two predetermined units. This of course will be the most natural way in calculations effected according to the decimal system as for instance where the result is expressed in dollars and cents. It will be obvious, however, that my invention is not limited to this particular embodiment and that the principle of my invention might be applied in different ways. Even in calculations according to the decimal system, it might be possible to round off to five different values (say, even numbers) instead of two; or in calculations involving the duodecimal system, for instance those relating to English money, the rounding off might be to two, three, four or six different units instead of twelve units. It will therefore be understood that various modifications may be made without departing from my invention as described in the appended claims.

I claim:

1. In a calculating machine including a result mechanism and an accumulator mechanism of which the latter includes a plurality of number wheels located side by side and rotatable individually about equidistant parallel axes, means for transferring a result from said result mechanism into said accumulator mechanism, and mechanism operative upon the accumulator mechanism for rounding off the result of a computation to the nearest unit of the lowest denomination, that improvement which comprises additional mechanism, likewise operative upon the accumulator mechanism, for further rounding off the result of the first rounding off to one or another of a limited number of predetermined units of the lowest denomination.

2. A calculating machine according to claim 1, in which the additional rounding off mechanism is constructed to bring the figure of the lowest denomination either to 0 or to 5.

3. A calculating machine according to claim 1, in which the additional rounding off mechanism is constructed to bring the figure of the lowest denomination to 0 if the first rounding off has brought the figure of the lowest denomination to 1, 2, 8, or 9, and to bring the figure of the lowest denomination to 5 if the first rounding off has brought the figure of the lowest denomination to 3, 4, 6, or 7.

4. A calculating machine according to claim 1, in which the additional rounding off mechanism comprises a double heart cam connected to rotate with the accumulator number wheel of lowest denomination and provided with recesses at diametrically opposite points corresponding to the figures 0 and 5 respectively of said wheel, and an actuating member co-operating with said cam to bring it to one or the other of its positions of rest.

5. A calculating machine according to claim 1, in which the additional rounding off mechanism comprises a double heart cam connected to rotate with the accumulator number wheel of lowest denomination and provided with recesses at diametrically opposite points corresponding to the figures 0 and 5 respectively of said wheel, and an actuating member co-operating with said cam to bring it to one or the other of its positions of rest, and in which there is provided a zero-setting device or rack and mechanism controlled by such device, for keeping said actuating member out of the path of said double heart cam during the transfer of results from the result mechanism into the accumulator mechanism.

6. A calculating machine according to claim 1, in which the accumulator number wheel of lowest denomination is provided with a tens preparing lug so arranged as to prepare a tens carrying operation to the next higher denomination in those cases in which the said number wheel is turned either from 7 to 8 or from 8 to 7.

7. In a calculating machine including a result mechanism, an accumulator mechanism, means for transferring a result from said result mechanism into said accumulator mechanism, the latter including a plurality of number wheels and an automatic device for rounding off the number transferred into said accumulator, said rounding-off device comprising a shaft located adjacent to the lowermost denominational position having a number wheel, a heart cam fast on said shaft, a tens transfer setting cam carried by said heart cam, a pressure member bearing against said heart cam to restore it to its normal position, that improvement which comprises additional mechanism for rounding off the number transferred into said accumulator to one of the values 0, 5, and 10, such rounding off being determined by the number values of a plurality of denominational positions of said additional mechanism, the latter consisting of a double heart cam held to rotate with said number wheel of lowermost denominational position and having two re-entering portions located at opposite points of the cam periphery, corresponding to positions in which said number wheel indicates the value zero or the value 5 respectively, a tens preparing lug carried by said double heart cam, and a pressure member bearing against said double heart cam to bring the latter to one or the other of its positions of rest, with such pressure member in engagement with one or the other of said re-entering portions.

8. A calculating machine having an automatic rounding-off device according to claim 7, in which the double heart cam held to rotate with the accumulator number wheel of lowermost denominational position is arranged to bring such number wheel to the zero position whenever the preliminary rounding-off produced by the other heart cam yields as 1, 2, 8 or 9 on said number wheel, and to bring such number wheel to the 5 position whenever the preliminary rounding-off produced by the other heart cam yields a 3, 4, 6, or 7 on said number wheel.

9. A calculating machine having an automatic rounding-off device according to claim 7, in which the machine is provided with a clearing rack and with means, controlled by said rack, for removing the pressure member from the double heart cam during the transfer of a result from the result mechanism into the accumulator mechanism.

10. In a calculating machine including a result mechanism and an accumulator mechanism each having a set of number wheels, the number wheels of the same set being rotatable individually about equidistant parallel axes located adjacent to each other, means for coupling the number wheels of one of said sets with the number wheels of like denominations in the other set, means for setting one or the other of said sets of number wheels to zero, means for effecting tens-carrying operations in each of said sets, means by which the transfer of a number value from the number wheels of one of said mechanisms to those of the other is effected by first successively coupling, in pairs, the number wheels of one mechanism with those of the other, then bringing one of said mechanisms to the zero position, and thereupon disconnecting the previously coupled number wheels and operating the tens-carrying means of that one of said mechanisms which has not been brought to the zero position; a shaft parallel to the axes of the number wheels of the accumulator mechanism and located on the side of the lowest number wheel opposite to the other number wheels of said mechanism, at a distance therefrom equal to that intervening between adjoining axes of said wheels, means for coupling said shaft with one of the number wheels of the result mechanism, a tens transfer setting cam held to rotate with said shaft and arranged to prepare a tens carrying operation in the lowest denomination number wheel of the accumulator mechanism whenever said shaft passes from the angular position corresponding to the digit 4, to the one corresponding to the digit 5; means for returning said shaft to the zero position after the transfer of a number value to the set of number wheels of the accumulator mechanism, that improvement which comprises supplemental mechanism for carrying out the previously prepared tens-carrying operation in the lowest denomination number wheel of the accumulator mechanism, said supplemental mechanism comprising a double heart cam having two diametrically opposite recesses in its periphery and operatively connected with said lowest denomination number wheel, a spring-pressed member bearing against said double heart cam and adapted, when in engagement with one of said recesses, to hold said cam in a position in which said lowest denomination number wheel will indicate either zero or 5, said spring-pressed member being further adapted to return said number wheel to zero if after the transfer of a number value to the accumulator mechanism such wheel indicates 1 or 2; to shift such number wheel to 5 if after the transfer of a number value to the accumulator mechanism such wheel indicates 3, 4, 6, or 7; and to shift said wheel forward to 0 if after the transfer of a number value to the accumulator mechanism such wheel indicates 8 or 9; the tens-carrying element connected with the lowermost denomination number wheel of the accumulator mechanism being arranged to prepare a tens-carrying operation in the number wheel of the next higher denomination of the same set whenever said lowest denomination number wheel passes from 7 to 8, or from 8 to 7.

AUGUST KOTTMANN.